(12) United States Patent
Wei et al.

(10) Patent No.: US 12,212,984 B2
(45) Date of Patent: *Jan. 28, 2025

(54) METHOD, USER EQUIPMENT, BASE STATION, AND SYSTEM FOR ENHANCING RELIABILITY OF WIRELESS COMMUNICATION

(71) Applicant: BEIJING ZHIGU RUI TUO TECH CO., LTD., Beijing (CN)

(72) Inventors: Na Wei, Beijing (CN); Ran Xu, Beijing (CN)

(73) Assignee: BEIJING ZHIGU RUI TUO TECH CO., LTD., Beijing (CN)

( * ) Notice: Subject to any disclaimer, the term of this patent is extended or adjusted under 35 U.S.C. 154(b) by 71 days.

This patent is subject to a terminal disclaimer.

(21) Appl. No.: 16/854,365

(22) Filed: Apr. 21, 2020

(65) Prior Publication Data

US 2020/0252815 A1    Aug. 6, 2020

Related U.S. Application Data

(63) Continuation of application No. 16/272,771, filed on Feb. 11, 2019, now Pat. No. 10,667,159, which is a
(Continued)

(30) Foreign Application Priority Data

Feb. 4, 2016   (CN) .......................... 201610079299.3

(51) Int. Cl.
  *H04W 24/08*   (2009.01)
  *H04B 17/309*   (2015.01)
  (Continued)

(52) U.S. Cl.
  CPC .......... *H04W 24/08* (2013.01); *H04B 17/309* (2015.01); *H04B 17/336* (2015.01);
  (Continued)

(58) Field of Classification Search
  CPC .. H04B 17/309; H04B 17/336; H04B 17/373; H04B 17/346; H04B 17/347;
  (Continued)

(56) References Cited

U.S. PATENT DOCUMENTS

| 2004/0196860 A1* | 10/2004 | Gao ...................... H04W 28/22 370/437 |
| 2007/0004415 A1* | 1/2007 | Abedi .................. H04W 36/18 455/442 |

(Continued)

FOREIGN PATENT DOCUMENTS

| CN | 102468948 A | 5/2012 |
| CN | 104221421 A | 12/2014 |

(Continued)

OTHER PUBLICATIONS

Notice of Allowance dated Jan. 3, 2019 for U.S. Appl. No. 15/412,685.
(Continued)

*Primary Examiner* — Stephen J Clawson
(74) *Attorney, Agent, or Firm* — Sheppard Mullin Richter & Hampton LLP

(57) ABSTRACT

The present application provides a method for enhancing reliability of wireless communication, comprising: monitoring, by a user equipment (UE), quality of downlink transmission between the UE and a base station (BS); and measuring, by the UE in response to a trigger event, transmission quality of at least one beam used for the downlink transmission between the UE and the BS, wherein the trigger event is used to indicate that quality of the downlink transmission between the UE and the BS does not meet a first preset condition. The present application further discloses a method, device, and system for enhancing reliability of wireless communication. By means of the solutions disclosed in the present application, transmission quality of a beam used for uplink/downlink transmission between a BS
(Continued)

and a UE can be non-periodically measured based on event triggers, which improves real-time performance of detection and greatly enhances reliability of wireless communication.

28 Claims, 13 Drawing Sheets

Related U.S. Application Data continuation of application No. 15/412,685, filed on Jan. 23, 2017, now Pat. No. 10,292,063.

(51) Int. Cl.
*H04B 17/336* (2015.01)
*H04B 17/373* (2015.01)
*H04L 5/00* (2006.01)

(52) U.S. Cl.
CPC ......... *H04B 17/373* (2015.01); *H04L 5/0023* (2013.01); *H04L 5/0048* (2013.01); *H04L 5/0094* (2013.01); *H04L 5/0085* (2013.01)

(58) Field of Classification Search
CPC .... H04W 24/08; H04L 5/0023; H04L 5/0048; H04L 5/0094; H04L 5/0085
See application file for complete search history.

(56) References Cited

U.S. PATENT DOCUMENTS

| | | | | |
|---|---|---|---|---|
| 2008/0189970 | A1* | 8/2008 | Wang | H04W 36/0058 33/701 |
| 2011/0269449 | A1* | 11/2011 | Kazmi | H04B 7/024 455/422.1 |
| 2011/0292897 | A1* | 12/2011 | Wu | H04W 72/0486 370/329 |
| 2012/0257584 | A1 | 10/2012 | Behravan et al. | |
| 2013/0010619 | A1* | 1/2013 | Fong | H04W 72/0453 370/252 |
| 2013/0242787 | A1* | 9/2013 | Sun | H04W 24/10 370/252 |
| 2014/0241171 | A1* | 8/2014 | Moon | H04W 24/02 370/242 |
| 2015/0003359 | A1* | 1/2015 | Hoshino | H04W 72/0413 370/329 |
| 2015/0296490 | A1 | 10/2015 | Yi et al. | |
| 2016/0278125 | A1* | 9/2016 | Liao | H04W 24/00 |
| 2017/0026962 | A1* | 1/2017 | Liu | H04B 7/0617 |

FOREIGN PATENT DOCUMENTS

| | | |
|---|---|---|
| CN | 104767586 A | 7/2015 |
| CN | 104854924 A | 8/2015 |

OTHER PUBLICATIONS

Non-Final Office Action dated Jul. 30, 2018 for U.S. Appl. No. 15/412,685.

Restriction Requirement dated Apr. 13, 2018 for U.S. Appl. No. 15/412,685.

* cited by examiner

METHOD, USER EQUIPMENT, BASE STATION, AND SYSTEM FOR ENHANCING RELIABILITY OF WIRELESS COMMUNICATION

CROSS REFERENCE TO RELATED APPLICATIONS

The present application is a continuation of U.S. patent application Ser. No. 16/272,771, filed on Feb. 11, 2019, which is a continuation of U.S. patent application Ser. No. 15/412,685, filed on Jan. 23, 2017, which is based on and claims priority to and benefit of Chinese Patent Application No. 201610079299.3, filed with China National Intellectual Property Administration (CNIPA) of People's Republic of China on Feb. 4, 2016, and entitled "METHOD, USER EQUIPMENT, BASE STATION, AND SYSTEM FOR ENHANCING RELIABILITY OF WIRELESS COMMUNICATION". The entire contents of all of the above-identified applications are incorporated herein by reference in their entirety.

TECHNICAL FIELD

The present application relates to the field of wireless communications, and in particular, to a method, user equipment (UE), a base station (BS), and a system for enhancing reliability of wireless communication.

BACKGROUND

In recent years, high frequency wireless communication attracts increasing attention due to abundant spectrum resources thereof. For example, if frequency exceeds 6 GHz, bandwidth can reach 100 MHz. Such abundant spectrum resources are important to a future wireless broadband communications system. Therefore, a high frequency wireless communications technology has been considered as one of the most important technologies in next ten years.

Certainly, the high frequency wireless communication also has disadvantages, and one of them is an excessively large transmission loss. To make up this disadvantage, a beam forming technology is usually applied to increase receive power. In the beam forming technology, a sending party focuses transmit power in a particular direction by deploying a lot of antennas, to ensure a signal to noise ratio (SNR) of a receiving party. The transmit power focusing requires small beam dispersion, which leads to a narrow transmission range of a beam in the particular direction. In this case, even though a location of the receiving party changes a little, an error may occur in beam matching, and greatly affects receive power of the receiving party.

To discover the beam mismatching phenomenon in time, in the prior art, a BS usually periodically sends a reference signal (RS) to a UE by using different beams in sequence. The UE can know transmission quality of the different beams according to these periodic RSs.

However, in an actual case, there are a lot of beams used for uplink/downlink transmission between the BS and the UE. Therefore, the technical solution in the prior art in which the BS periodically sends an RS to the UE has low efficiency. If transmission quality of a beam currently serving the BS and the UE (serving beam, which is referred to as an active beam below) or a beam currently not serving the BS and the UE (non-serving beam, which is referred to as a standby beam below) deteriorates, the UE or the BS may take a long time to discover the deterioration, which greatly reduces reliability of wireless communication.

SUMMARY

An objective of the present application is to provide a method, a UE, a BS, and a system for enhancing reliability of wireless communication.

According to a first aspect of at least one embodiment of the present application, a method for enhancing reliability of wireless communication is provided, comprising: monitoring, by a UE, quality of downlink transmission between the UE and a BS; and measuring, by the UE in response to a trigger event, transmission quality of at least one beam used for the downlink transmission between the UE and the BS, wherein the trigger event is used to indicate that quality of the downlink transmission between the UE and the BS does not meet a first preset condition.

According to a second aspect of at least one embodiment of the present application, another method for enhancing reliability of wireless communication is provided, comprising: monitoring, by a BS, quality of uplink transmission between a UE and the BS; and measuring, by the BS in response to a trigger event, transmission quality of at least one beam used for the uplink transmission between the BS and the UE, wherein the trigger event is used to indicate that quality of the uplink transmission between the BS and the UE does not meet a first preset condition.

According to a third aspect of at least one embodiment of the present application, a UE for enhancing reliability of wireless communication is provided, comprising: a monitoring module, configured to monitor quality of downlink transmission between the UE and a BS; and a measurement module, configured to measure, in response to a trigger event, transmission quality of at least one beam used for the downlink transmission between the UE and the BS, wherein the trigger event is used to indicate that quality of the downlink transmission between the UE and the BS does not meet a first preset condition.

According to a fourth aspect of at least one embodiment of the present application, a BS for enhancing reliability of wireless communication is provided, comprising: a monitoring module, configured to monitor quality of uplink transmission between a UE and the BS; and a measurement module, configured to measure, in response to a trigger event, transmission quality of at least one beam used for the uplink transmission between the BS and the UE, wherein the trigger event is used to indicate that quality of the uplink transmission between the BS and the UE does not meet a first preset condition.

According to a fifth aspect of at least one embodiment of the present application, another UE for enhancing reliability of wireless communication is provided, comprising: a processor and a memory, wherein the memory is configured to store an instruction, and the processor is configured to execute the instruction, to perform the following steps: monitoring quality of downlink transmission between the UE and a BS; and measuring, in response to a trigger event, transmission quality of at least one beam used for the downlink transmission between the UE and the BS, wherein the trigger event is used to indicate that quality of the downlink transmission between the UE and the BS does not meet a first preset condition.

According to a sixth aspect of at least one embodiment of the present application, another BS for enhancing reliability of wireless communication is provided, comprising: a processor and a memory, wherein the memory is configured to store an instruction, and the processor is configured to execute the instruction, to perform the following steps: monitoring quality of uplink transmission between a UE and the BS; and measuring, in response to a trigger event, transmission quality of at least one beam used for the uplink transmission between the BS and the UE, wherein the trigger event is used to indicate that quality of the uplink transmission between the BS and the UE does not meet a first preset condition.

According to a seventh aspect of at least one embodiment of the present application, a system for enhancing reliability of wireless communication is provided, comprising: a BS and a UE, wherein the UE is configured to monitor quality of downlink transmission between the UE and the BS; and measure, in response to a trigger event, transmission quality of at least one beam used for the downlink transmission between the UE and the BS, wherein the trigger event is used to indicate that quality of the downlink transmission between the UE and the BS does not meet a first preset condition.

According to an eighth aspect of at least one embodiment of the present application, another system for enhancing reliability of wireless communication is provided, comprising: a BS and a UE, wherein the BS is configured to monitor quality of uplink transmission between the UE and the BS; and measure, in response to a trigger event, transmission quality of at least one beam used for the uplink transmission between the BS and the UE, wherein the trigger event is used to indicate that quality of the uplink transmission between the BS and the UE does not meet a first preset condition.

According to the method, UE, base station, and system for enhancing reliability of wireless communication in the embodiments of the present application, transmission quality of a beam used for uplink/downlink transmission between a BS and a UE can be non-periodically measured based on event trigger, which improves real-time performance of detection and greatly enhances reliability of wireless communication.

DETAILED DESCRIPTION

Specific implementing manners of the present application are further described in detail below with reference to accompanying drawings and embodiments. The following embodiments are intended to describe the present application, but not to limit the scope of the present application.

A person skilled in the art understands that, in the embodiments of the present application, sequence numbers of the following steps do not mean an execution order, the execution order of the steps should be determined according to their functions and internal logic, and shall not be construed as a limitation to implementation processes of the embodiments of the present application.

In addition, terms such as "first" and "second" in the present application are intended only to distinguish different steps, devices, modules, or the like, which neither represent any particular technical meaning, nor indicate a necessary logical order between them.

Figure 1:
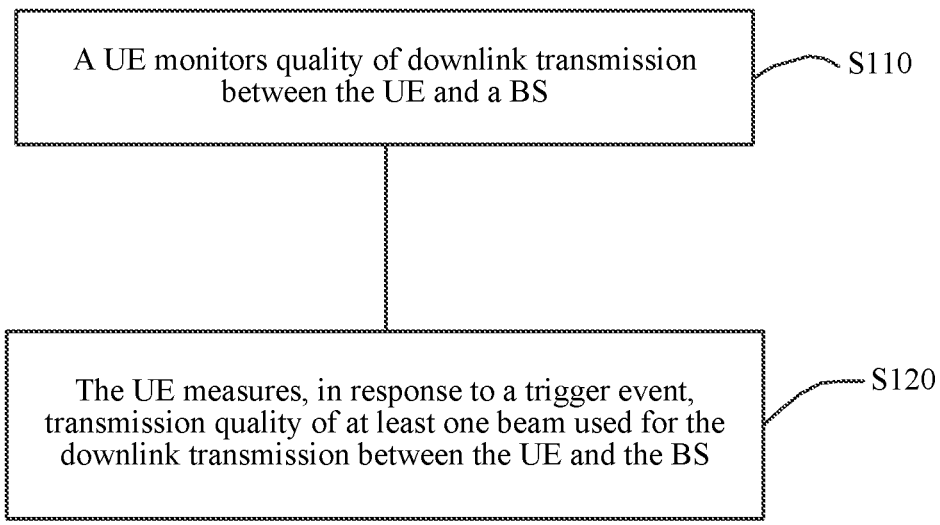
FIG. 1 is a flowchart of a method for enhancing reliability of wireless communication according to an embodiment of the present application.

FIG. 1 is a flowchart of a method for enhancing reliability of wireless communication according to an embodiment of the present application. As shown in FIG. 1, the method may comprise:

S110: A UE monitors quality of downlink transmission between the UE and a BS.

S120: The UE measures, in response to a trigger event, transmission quality of at least one beam used for the downlink transmission between the UE and the BS, wherein the trigger event is used to indicate that quality of the downlink transmission between the UE and the BS does not meet a first preset condition.

By means of the method in this embodiment of the present application, transmission quality of a beam used for downlink transmission between a BS and UE can be non-periodically measured based on event trigger, which improves real-time performance of detection and greatly enhances reliability of wireless communication.

Optionally, in this embodiment of the present application, the trigger event may be one or a combination of the following events:

an event 1: transmission quality of an active beam used for the downlink transmission between the UE and the BS does not meet a second preset condition, for example, an SNR of the active beam used for the downlink transmission between the UE and the BS is less than an SNR threshold;

an event 2: transmission quality of a standby beam used for the downlink transmission between the UE and the BS does not meet a third preset condition, for example, a packet loss rate of the standby beam used for the downlink transmission between the UE and the BS exceeds a packet loss rate threshold;

an event 3: a time interval from a latest measurement of the transmission quality of the at least one beam used for the downlink transmission between the UE and the BS does not meet a fourth preset condition, for example, the time interval from the latest measurement of the transmission quality of the at least one beam used for the downlink transmission between the UE and the BS exceeds a time threshold; and an event 4: a latency change of a channel used for the downlink transmission between the UE and the BS does not meet a fifth preset condition, for example, the latency change of the channel used for the downlink transmission between the UE and the BS exceeds a preset range.

In an implementing manner of the present application, the first preset condition in S120 may be any one of the second preset condition in the event 1, the third preset condition in the event 2, the fourth preset condition in the event 3, and the fifth preset condition in the event 4; or may be a combination of at least two of the second preset condition in the event 1, the third preset condition in the event 2, the fourth preset condition in the event 3, and the fifth preset condition in the event 4.

Exemplarily, if the trigger event is the event 1, the first preset condition in S120 may be the second preset condition. If the trigger event is "the event 1+the event 2", the first preset condition in S120 may be a set of the second preset condition in the event 1 and the third preset condition in the event 2.

Optionally, in another implementing manner of the present application, the second preset condition in the event 1 and/or the third preset condition in the event 2 may be any performance parameter that can measure transmission quality, for example, the above-mentioned SNR threshold or packet loss rate threshold, and certainly, may be another performance parameter, which is not specifically limited in this embodiment of the present application.

Optionally, in another implementing manner of the present application, the time threshold in the event 3 may be set according to a movement speed of the UE. If the movement speed of the UE changes, the time threshold may be adjusted correspondingly. For example, a faster movement speed of the UE may indicate that the time threshold is adjusted smaller. In this way, when the UE moves at a high speed, a beam measurement frequency can be improved, to ensure reliability of wireless communication. Preferably, the movement speed of the UE may be an angular velocity of movement of the UE.

Figure 2:
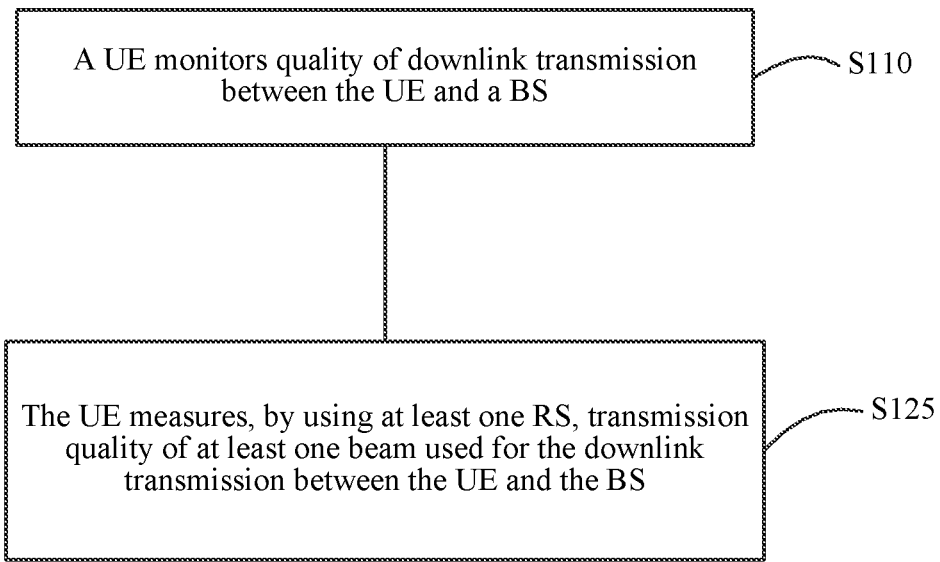
FIG. 2 is a flowchart of a method for enhancing reliability of wireless communication according to another embodiment of the present application.

Optionally, as shown in FIG. 2, the measuring, by the UE, transmission quality of at least one beam used for the downlink transmission between the UE and the BS in S120 may comprise:

S125: The UE measures, by using at least one RS, the transmission quality of the at least one beam used for the downlink transmission between the UE and the BS.

Figure 3:
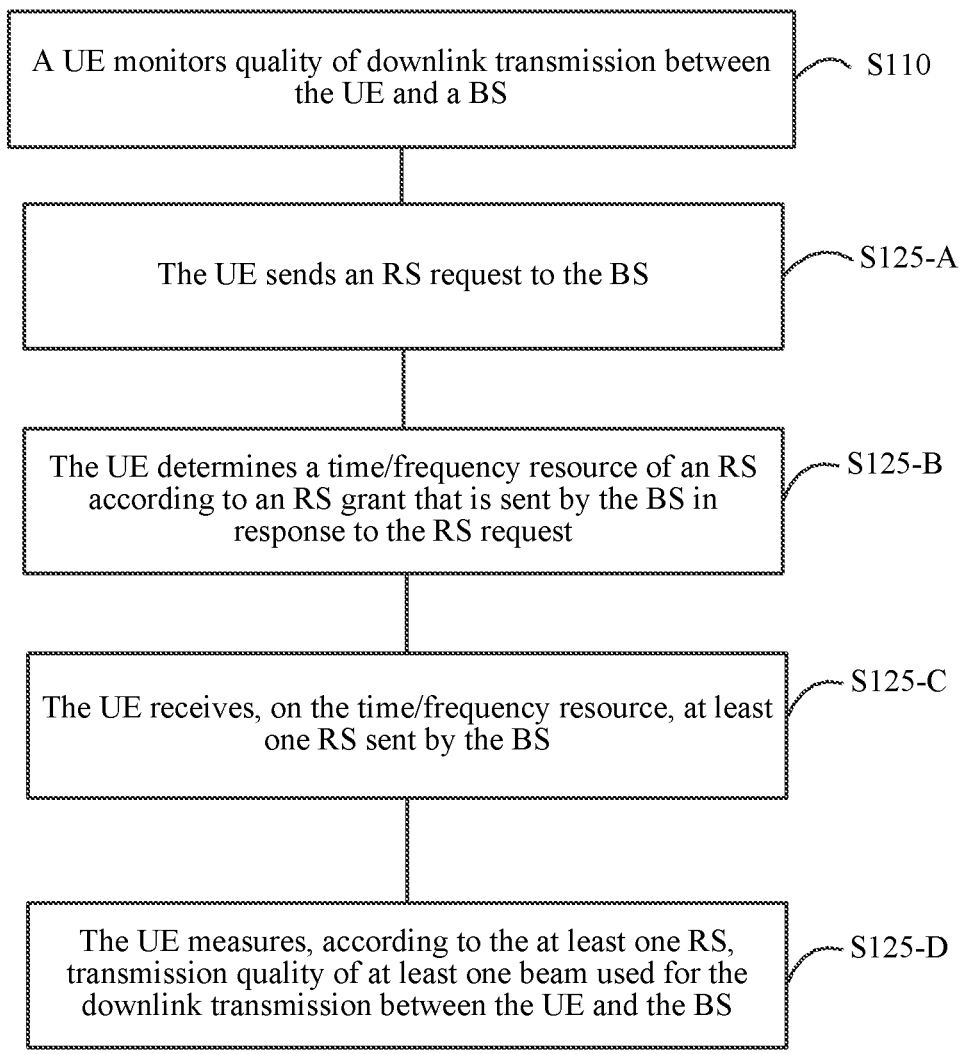
FIG. 3 is a flowchart of a method for enhancing reliability of wireless communication according to another embodiment of the present application.

Optionally, as shown in FIG. 3, in an implementing manner of the present application, the measuring, by the UE by using at least one RS, the transmission quality of the at least one beam used for the downlink transmission between the UE and the BS in S125 may comprise:

S125-A: The UE sends an RS request to the BS.

S125-B: The UE determines a time/frequency resource of an RS according to an RS grant that is sent by the BS in response to the RS request.

S125-C: The UE receives, on the time/frequency resource, at least one RS sent by the BS.

S125-D: The UE measures, according to the at least one RS, the transmission quality of the at least one beam used for the downlink transmission between the UE and the BS.

In this embodiment of the present application, the RS request may have multiple formats, or even may be simply indicated by one bit. Optionally, the RS request may further carry information about the at least one beam that is used for the downlink transmission between the UE and the BS and that is to be measured by the UE, for example, a beam index, which is not specifically limited in this embodiment of the present application.

After receiving the RS request, the BS arranges a downlink RS transmission for the UE, for example, determines a time or frequency resource for transmitting the RS. After determining the time or frequency resource for the RS, the BS may send an RS grant to the UE, to notify the arranged information to the UE. After receiving the RS grant, the UE knows the time or frequency resource on which the BS sends the RS to the UE, and can receive, on a corresponding time or frequency resource, the RS from the BS. If there are multiple beams used for the downlink transmission between the UE and the BS, the BS sends multiple RSs to the UE by using the multiple beams, and the UE can measure transmission quality of each beam by using an RS that is received by using the corresponding beam. For example, the UE may detect a transmission latency or an SNR of the corresponding beam according to the received RS, and the UE can know the transmission quality of the corresponding beam according to these performance measurement parameters.

Exemplarily, the RS grant may be carried in a symbol that is in a downlink subframe and that is reserved for control information, and certainly, may be transmitted to the UE in another manner, which is not specifically limited in this embodiment of the present application.

Figure 4:
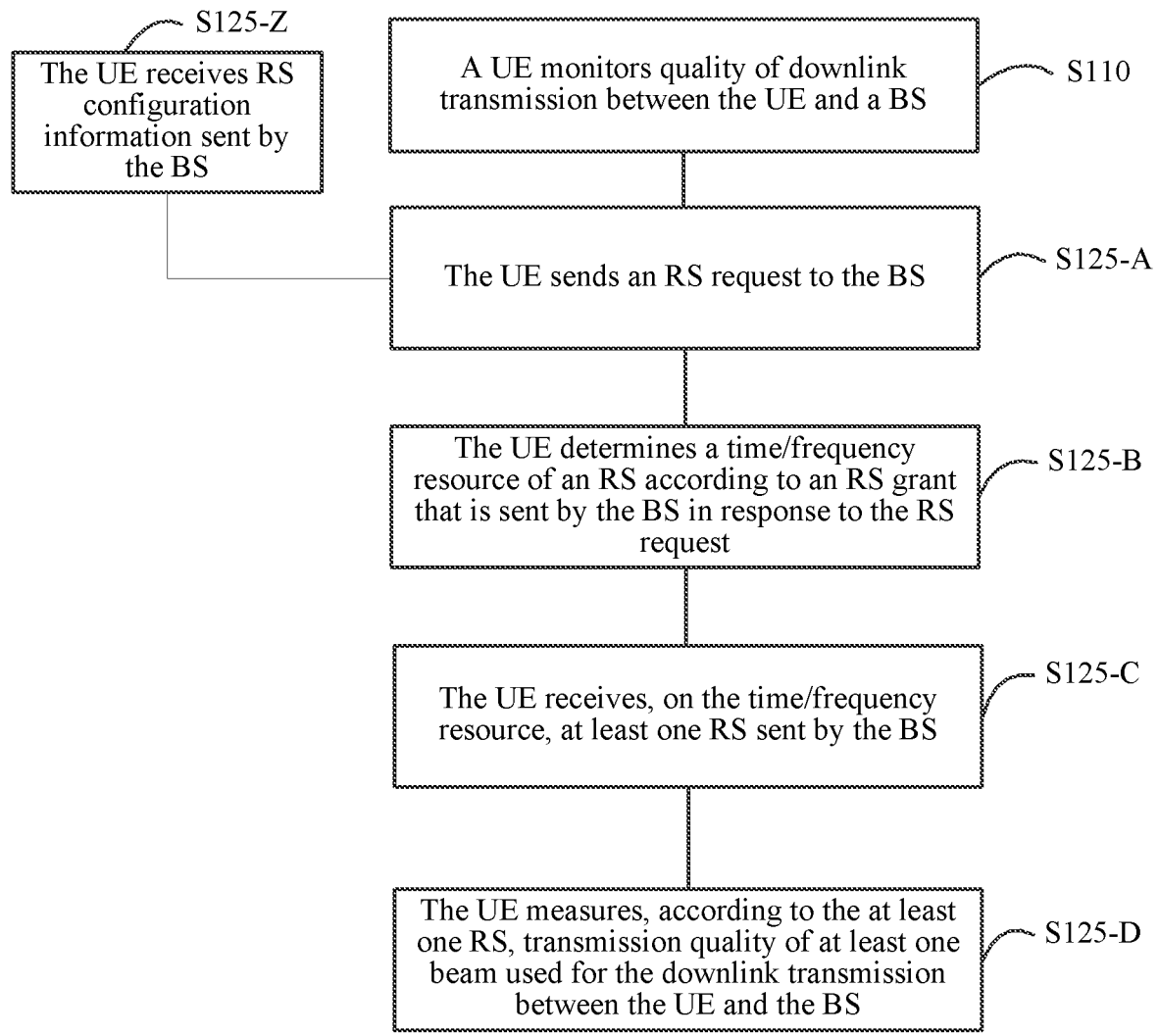
FIG. 4 is a flowchart of a method for enhancing reliability of wireless communication according to another embodiment of the present application.

Optionally, as shown in FIG. 4, in another implementing manner of the present application, before the sending, by the UE, an RS request to the BS (S125-A), the method may further comprise:

S125-Z: The UE receives RS configuration information sent by the BS.

Exemplarily, the RS configuration information may comprise a format of the RS request. Different UEs may have different RS request formats. The UE may generate, according to the RS configuration information, an RS request that meets a BS requirement. Alternatively, the RS configuration information may comprise the trigger event. According to the RS configuration information, the UE can know in advance what event should be monitored. Once the event is detected, the UE is triggered to measure the transmission quality of the at least one beam used for the downlink transmission between the UE and the BS. Alternatively, the RS configuration information may comprise both the format of the RS request and the trigger event. Alternatively, the RS configuration information may comprise other information, which is not specifically limited in this embodiment of the present application.

Figure 5:
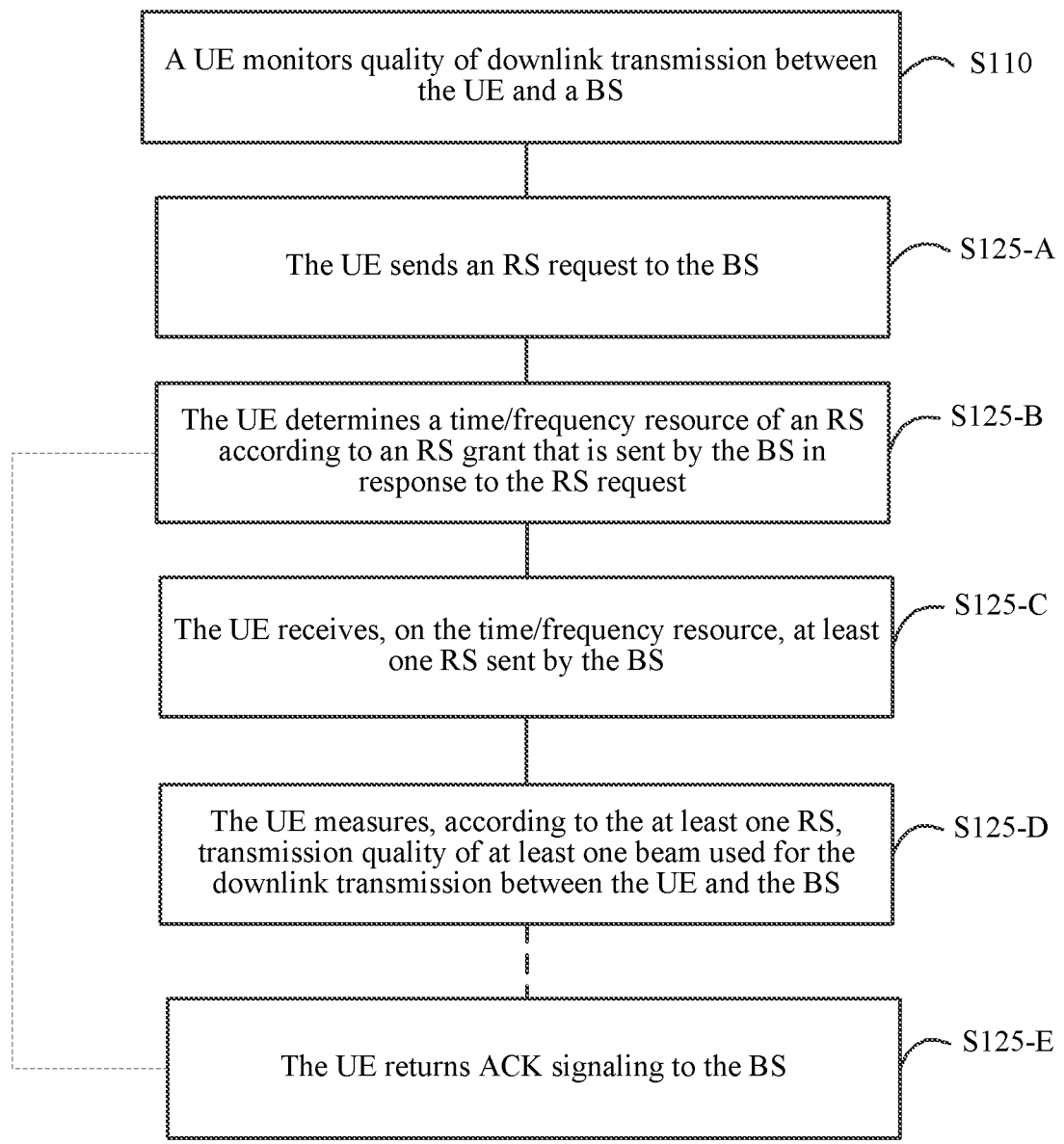
FIG. 5 is a flowchart of a method for enhancing reliability of wireless communication according to another embodiment of the present application.

Optionally, as shown in FIG. 5, in another implementing manner of the present application, the method may further comprise:

S125-E: The UE returns ACK signaling to the BS, wherein the ACK signaling is used to indicate that the UE has received the RS grant and/or the measurement has been completed.

S125-E may be performed after S125-B, or may be performed after S125-D, which is not limited in this embodiment of the present application.

Figure 6:
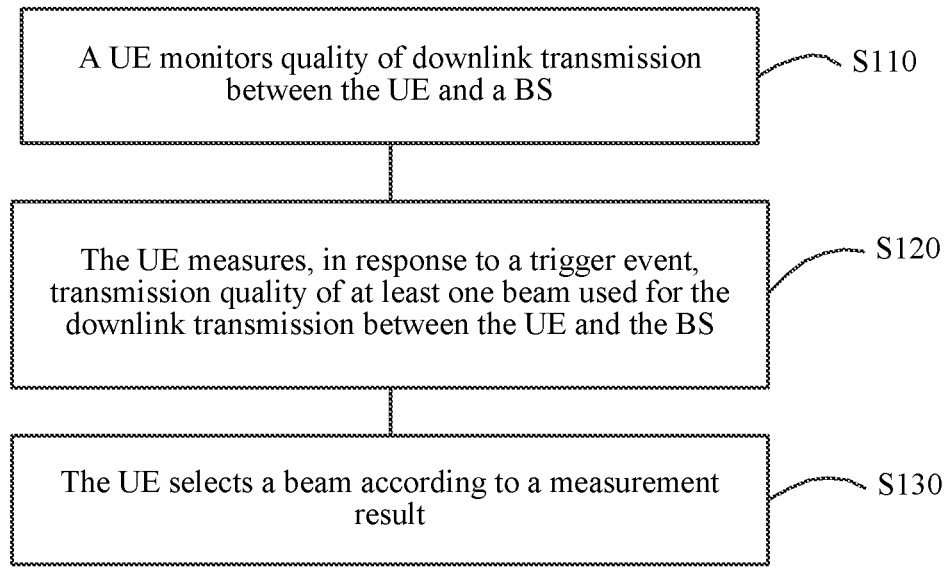
FIG. 6 is a flowchart of a method for enhancing reliability of wireless communication according to another embodiment of the present application.

Optionally, as shown in FIG. 6, in another implementing manner of the present application, after the measuring, by the UE in response to a trigger event, transmission quality of at least one beam used for the downlink transmission between the UE and the BS (S120), the method may further comprise:

S130: The UE selects a beam according to a measurement result.

For example, if the UE determines, according to the measurement result, that transmission quality of a current active beam cannot meet a transmission requirement, the UE reselects a beam as a new active beam for the downlink transmission.

In this implementing manner of the present application, the downlink transmission between the UE and the BS may be downlink data transmission between the UE and the BS, or may be downlink control signaling transmission between the UE and the BS, or a set of the two types of downlink transmission, which is not specifically limited in this embodiment of the present application.

Figure 7:
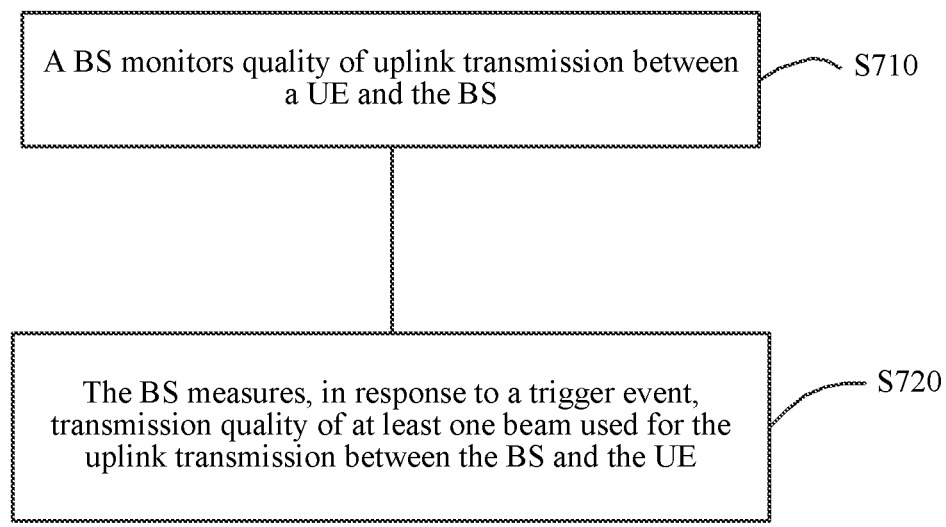
FIG. 7 is a flowchart of another method for enhancing reliability of wireless communication according to an embodiment of the present application.

FIG. 7 is a flowchart of a method for enhancing reliability of wireless communication according to another embodiment of the present application. As shown in FIG. 7, the method may comprise:

S710: A BS monitors quality of uplink transmission between a UE and the BS.

S720: The BS measures, in response to a trigger event, transmission quality of at least one beam used for the uplink transmission between the BS and the UE, wherein the trigger event is used to indicate that quality of the uplink transmission between the BS and the UE does not meet a first preset condition.

By means of the method in this embodiment of the present application, transmission quality of a beam used for uplink transmission between a BS and UE can be non-periodically measured based on event trigger, which improves real-time performance of detection and greatly enhances reliability of wireless communication.

Similar to the downlink solution described above, in an optional embodiment of the present application, the trigger event may be one or a combination of the following events:

an event A: transmission quality of an active beam used for the uplink transmission between the UE and the BS does not meet a second preset condition, for example, an SNR of the active beam used for the uplink transmission between the UE and the BS is less than an SNR threshold;

an event B: transmission quality of a standby beam used for the uplink transmission between the UE and the BS does not meet a third preset condition, for example, a packet loss rate of the standby beam used for the uplink transmission between the UE and the BS exceeds a packet loss rate threshold;

an event C: a time interval from a latest measurement of the transmission quality of the at least one beam used for the uplink transmission between the UE and the BS does not meet a fourth preset condition, for example, the time interval from the latest measurement of the transmission quality of the at least one beam used for the uplink transmission between the UE and the BS exceeds a time threshold; and an event D: a latency change of a channel used for the uplink transmission between the UE and the BS does not meet a fifth preset condition, for example, the latency change of the channel used for the uplink transmission between the UE and the BS exceeds a preset range.

In an implementing manner of the present application, the first preset condition in S720 may be any one of the second preset condition in the event A, the third preset condition in the event B, the fourth preset condition in the event C, and the fifth preset condition in the event D; or may be a combination of at least two of the second preset condition in the event A, the third preset condition in the event B, the fourth preset condition in the event C, and the fifth preset condition in the event D.

Exemplarily, if the trigger event is the event A, the first preset condition in S720 may be the second preset condition in the event A. If the trigger event is "the event A+the event B", the first preset condition in S720 may be a set of the second preset condition in the event A and the third preset condition in the event B.

Optionally, in another implementing manner of the present application, the second preset condition in the event A and/or the third preset condition in the event B may be any performance parameter that can measure transmission quality, for example, the above-mentioned SNR threshold or packet loss rate threshold, and certainly, may be another performance parameter, which is not specifically limited in this embodiment of the present application.

Figure 8:
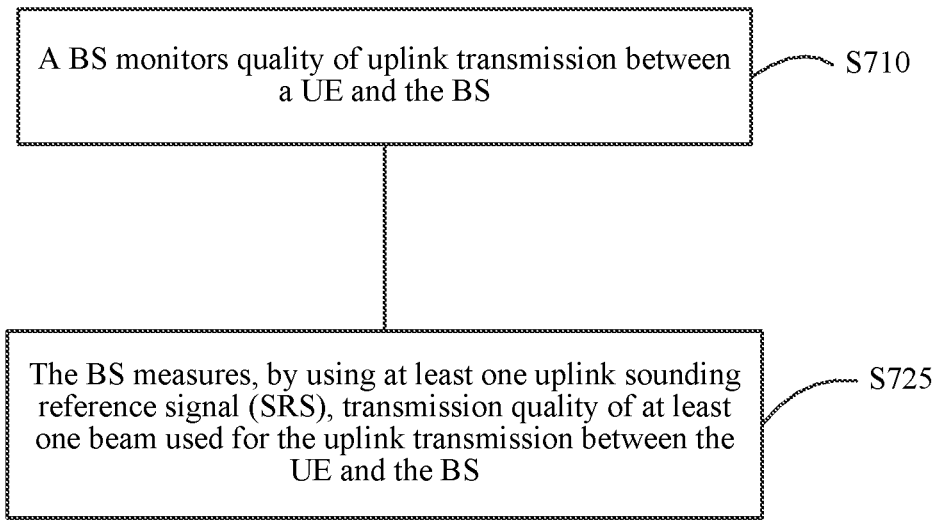
FIG. 8 is a flowchart of another method for enhancing reliability of wireless communication according to another embodiment of the present application.

Optionally, as shown in FIG. 8, in an optional implementing manner, the measuring, by the BS, transmission quality of at least one beam used for the uplink transmission between the BS and the UE in S720 may comprise:

S725: The BS measures, by using at least one uplink sounding reference signal (SRS), the transmission quality of the at least one beam used for the uplink transmission between the UE and the BS.

Figure 9:
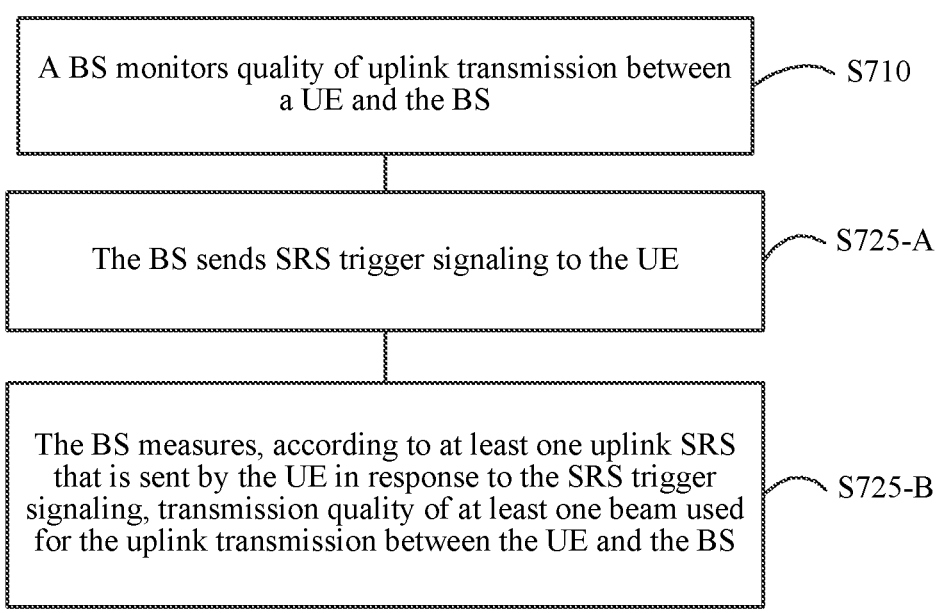
FIG. 9 is a flowchart of another method for enhancing reliability of wireless communication according to another embodiment of the present application.

Optionally, as shown in FIG. 9, in an optional implementing manner, the measuring, by the BS by using at least one uplink SRS, the transmission quality of the at least one beam used for the uplink transmission between the UE and the BS in S725 may comprise:

S725-A: The BS sends SRS trigger signaling to the UE.

S725-B: The BS measures, according to at least one uplink SRS that is sent by the UE in response to the SRS trigger signaling, the transmission quality of the at least one beam used for the uplink transmission between the UE and the BS.

Exemplarily, the SRS trigger signaling may carry information about the at least one beam that is used for the uplink transmission between the UE and the BS and that is to be measured by the BS, for example, a beam index, which is not specifically limited in this embodiment of the present application.

Figure 10:
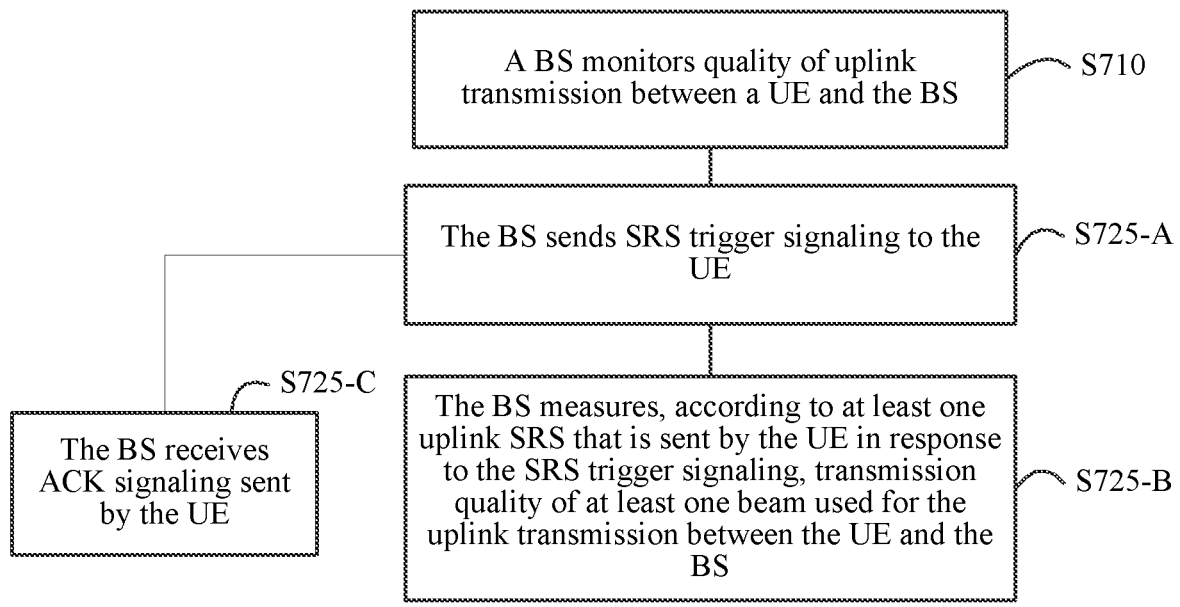
FIG. 10 is a flowchart of another method for enhancing reliability of wireless communication according to another embodiment of the present application.

Optionally, as shown in FIG. 10, in an optional implementing manner, after S725-A, the method may further comprise:

S725-C: The BS receives ACK signaling sent by the UE, wherein the ACK signaling is used to indicate that the UE has received the SRS trigger signaling.

In this implementing manner of the present application, the uplink transmission between the UE and the BS may be uplink data transmission between the UE and the BS, or may be uplink control signaling transmission between the UE and the BS, or a set of the two types of uplink transmission, which is not specifically limited in this embodiment of the present application.

Figure 11:
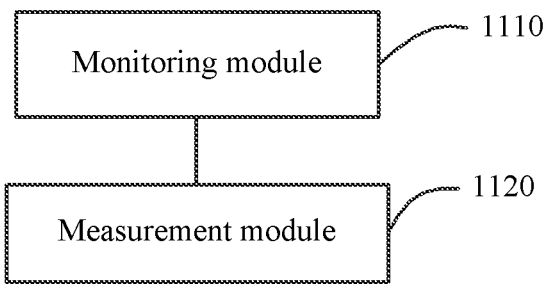
FIG. 11 is a schematic structural diagram of a UE for enhancing reliability of wireless communication according to an embodiment of the present application.

FIG. 11 is a schematic structural diagram of a UE for enhancing reliability of wireless communication according to another embodiment of the present application. Referring to FIG. 11, the UE may comprise:

a monitoring module 1110, configured to monitor quality of downlink transmission between the UE and a BS; and a measurement module 1120, configured to measure, in response to a trigger event, transmission quality of at least one beam used for the downlink transmission between the UE and the BS, wherein the trigger event is used to indicate that quality of the downlink transmission between the UE and the BS does not meet a first preset condition.

Figure 12:
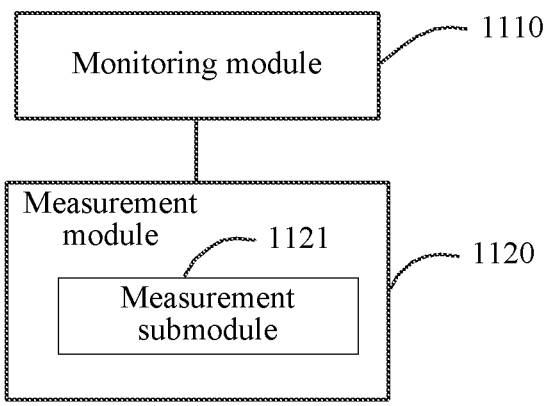
FIG. 12 is a schematic structural diagram of a UE for enhancing reliability of wireless communication according to another embodiment of the present application.

Optionally, as shown in FIG. 12, in an implementing manner of the present application, the measurement module 1120 may comprise:

a measurement submodule 1121, configured to measure, by using at least one RS, the transmission quality of the at least one beam used for the downlink transmission between the UE and the BS.

Figure 13:
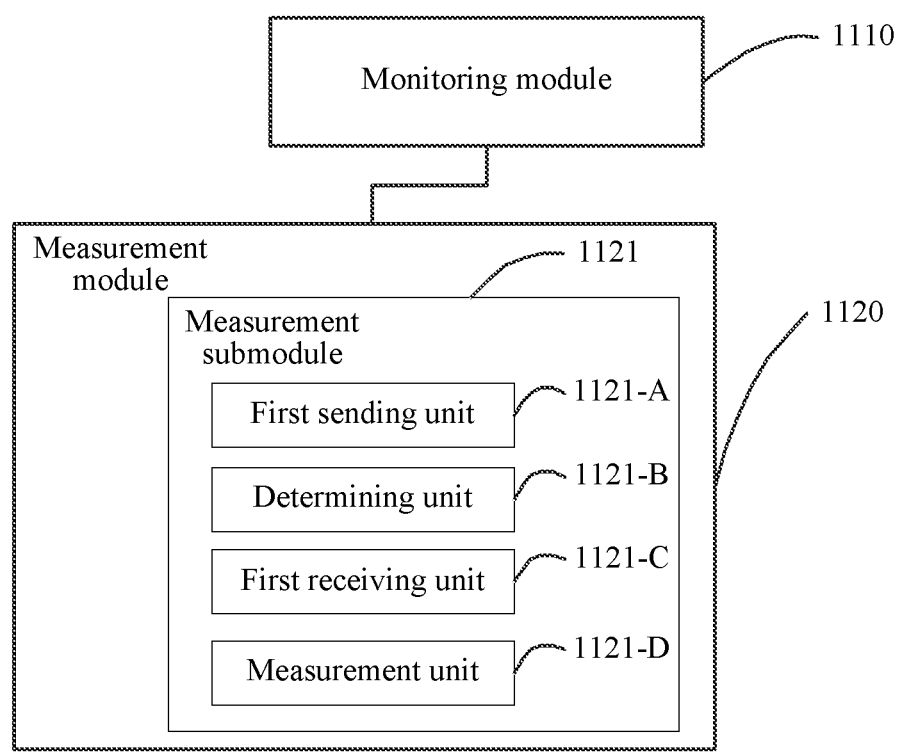
FIG. 13 is a schematic structural diagram of a UE for enhancing reliability of wireless communication according to another embodiment of the present application.

Optionally, as shown in FIG. 13, in an implementing manner of the present application, the measurement submodule 1121 may comprise:

a first sending unit 1121-A, configured to send an RS request to the BS;

a determining unit 1121-B, configured to determine a time/frequency resource of an RS according to an RS grant that is sent by the BS in response to the RS request;

a first receiving unit 1121-C, configured to receive, on the time/frequency resource, at least one RS sent by the BS; and a measurement unit 1121-D, configured to measure, according to the at least one RS, the transmission quality of the at least one beam used for the downlink transmission between the UE and the BS.

Figure 14:
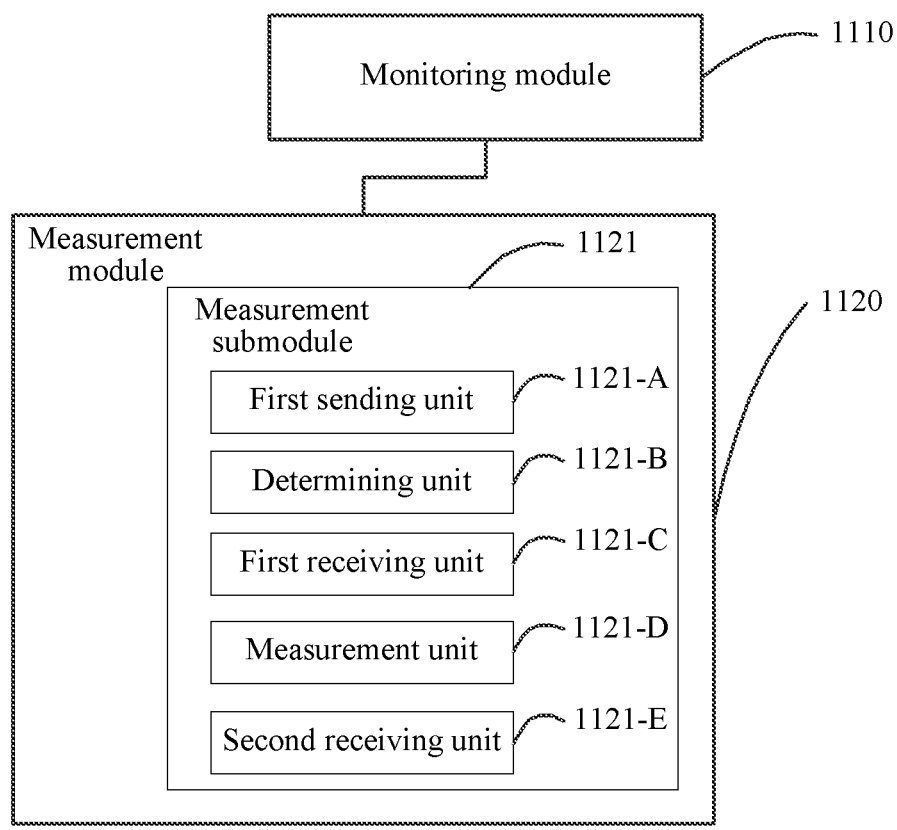
FIG. 14 is a schematic structural diagram of a UE for enhancing reliability of wireless communication according to another embodiment of the present application.

Optionally, as shown in FIG. 14, in an implementing manner of the present application, the measurement submodule 1121 may further comprise:

a second receiving unit 1121-E, configured to receive RS configuration information sent by the BS.

Figure 15:
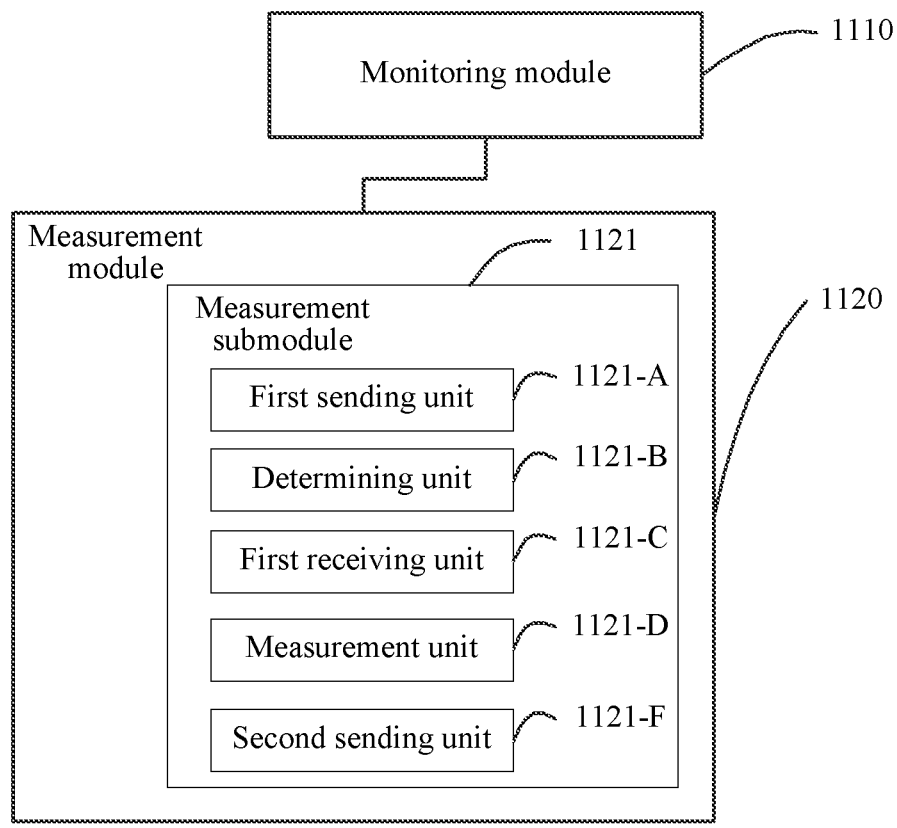
FIG. 15 is a schematic structural diagram of a UE for enhancing reliability of wireless communication according to another embodiment of the present application.

Optionally, as shown in FIG. 15, in an implementing manner of the present application, the measurement submodule 1121 may further comprise:

a second sending unit 1121-F, configured to return ACK signaling to the BS, wherein the ACK signaling is used to indicate that the UE has received the RS grant and/or the measurement has been completed.

Figure 16:
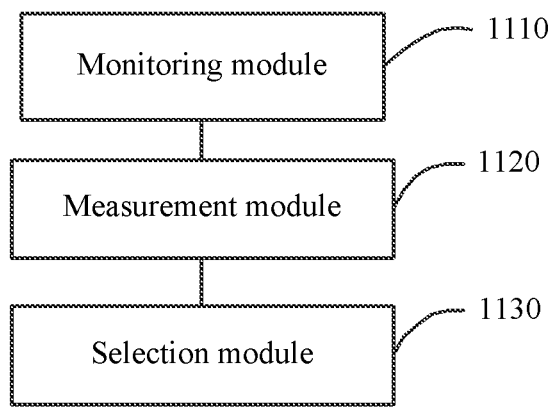
FIG. 16 is a schematic structural diagram of a UE for enhancing reliability of wireless communication according to another embodiment of the present application.

Optionally, as shown in FIG. 16, in an implementing manner of the present application, the UE may further comprise:

a selection module 1130, configured to select a beam according to a measurement result.

Figure 17:
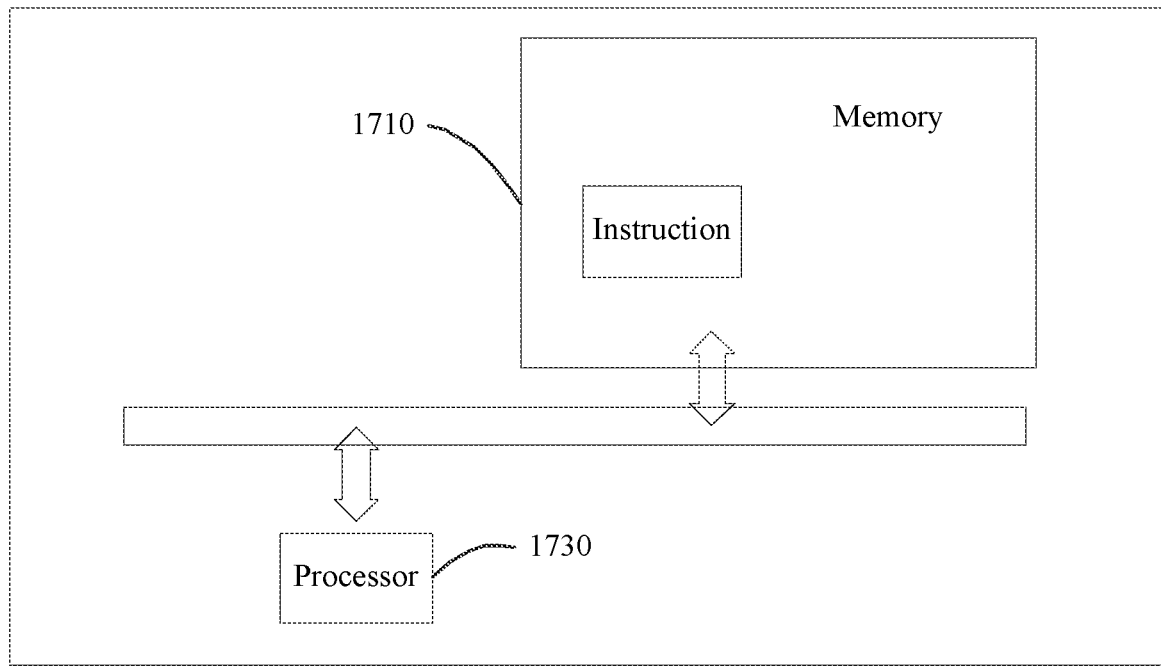
FIG. 17 is a schematic structural diagram of another UE for enhancing reliability of wireless communication according to another embodiment of the present application.

FIG. 17 is a schematic structural diagram of another UE for enhancing reliability of wireless communication according to another embodiment of the present application. Referring to FIG. 17, the UE may comprise a processor 1730 and a memory 1710, wherein the memory 1710 is configured to store an instruction, and the processor 730 is configured to execute the instruction, to perform the following steps:

monitoring quality of downlink transmission between the UE and a BS; and measuring, in response to a trigger event, transmission quality of at least one beam used for the downlink transmission between the UE and the BS, wherein the trigger event is used to indicate that quality of the downlink transmission between the UE and the BS does not meet a first preset condition.

A person of skill in the art may clearly understand that, for ease and brevity of description, for a specific working process of the described UE for enhancing reliability of wireless communication, refer to a corresponding process description of any one of the methods for enhancing reliability of wireless communication in the foregoing method embodiments shown in FIG. 1 to FIG. 6. Details are not described herein again.

In conclusion, by means of the UE for enhancing reliability of wireless communication in this embodiment of the present application, transmission quality of a beam used for downlink transmission between a BS and a UE can be non-periodically measured based on event trigger, which improves real-time performance of detection and greatly enhances reliability of wireless communication.

Figure 18:
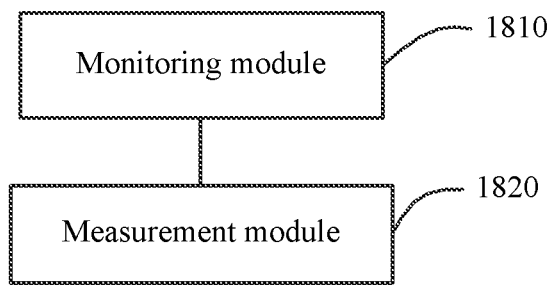
FIG. 18 is a schematic structural diagram of a BS for enhancing reliability of wireless communication according to an embodiment of the present application.

FIG. 18 is a schematic structural diagram of a BS for enhancing reliability of wireless communication according to another embodiment of the present application. Referring to FIG. 18, the BS may comprise:

a monitoring module 1810, configured to monitor quality of uplink transmission between a UE and the BS; and a measurement module 1820, configured to measure, in response to a trigger event, transmission quality of at least one beam used for the uplink transmission between the BS and the UE, wherein the trigger event is used to indicate that quality of the uplink transmission between the BS and the UE does not meet a first preset condition.

Figure 19:
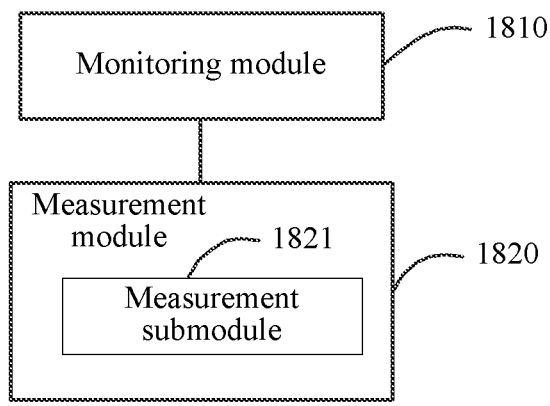
FIG. 19 is a schematic structural diagram of a BS for enhancing reliability of wireless communication according to another embodiment of the present application.

Optionally, as shown in FIG. 19, in an implementing manner of the present application, the measurement module 1820 may comprise:

a measurement submodule 1821, configured to measure, by using at least one uplink SRS, the transmission quality of the at least one beam used for the uplink transmission between the UE and the BS.

Figure 20:
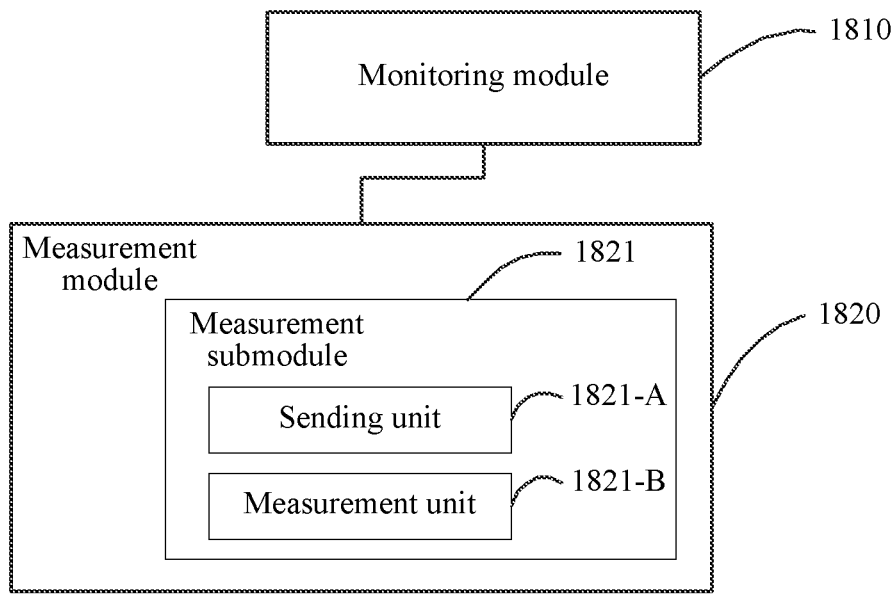
FIG. 20 is a schematic structural diagram of a BS for enhancing reliability of wireless communication according to another embodiment of the present application.

Optionally, as shown in FIG. 20, in an implementing manner of the present application, the measurement submodule 1821 may comprise:

a sending unit 1821-A, configured to send SRS trigger signaling to the UE; and a measurement unit 1821-B, configured to measure, according to at least one uplink SRS that is sent by the UE in response to the SRS trigger signaling, the transmission quality of the at least one beam used for the uplink transmission between the UE and the BS.

Figure 21:
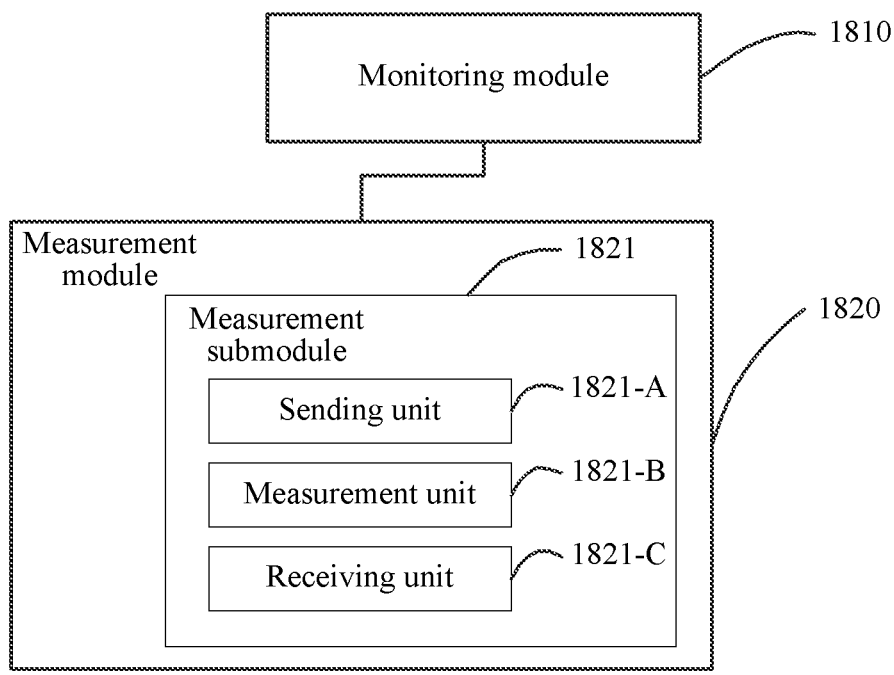
FIG. 21 is a schematic structural diagram of a BS for enhancing reliability of wireless communication according to another embodiment of the present application.

Optionally, as shown in FIG. 21, in an implementing manner of the present application, the measurement submodule 1821 may further comprise:

a receiving unit 1821-C, configured to receive ACK signaling sent by the UE, wherein the ACK signaling is used to indicate that the UE has received the SRS trigger signaling.

Figure 22:
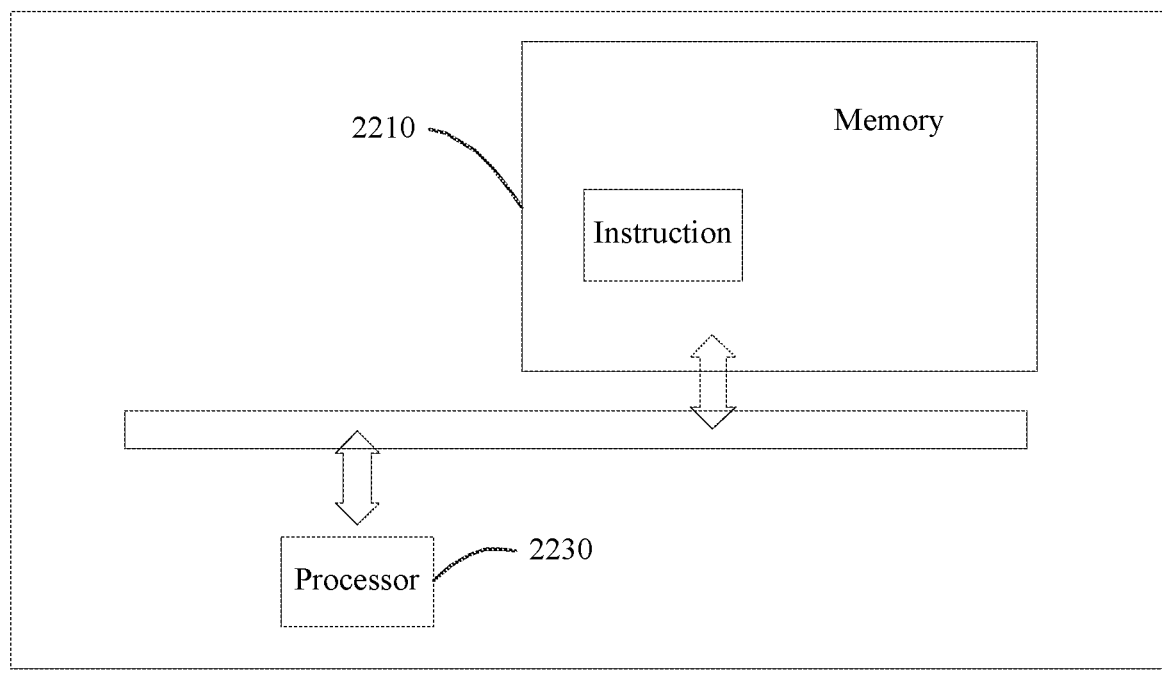
FIG. 22 is a schematic structural diagram of another BS for enhancing reliability of wireless communication according to another embodiment of the present application.

FIG. 22 is a schematic structural diagram of another BS for enhancing reliability of wireless communication according to another embodiment of the present application. Referring to FIG. 22, the BS may comprise a processor 2230 and a memory 2210, wherein the memory 2210 is configured to store an instruction, and the processor 2230 is configured to execute the instruction, to perform the following steps:

monitoring quality of uplink transmission between a UE and the BS; and measuring, in response to a trigger event, transmission quality of at least one beam used for the uplink transmission between the BS and the UE, wherein the trigger event is used to indicate that quality of the uplink transmission between the BS and the UE does not meet a first preset condition.

A person of skill in the art may clearly understand that, for ease and brevity of description, for a specific working process of the described BS for enhancing reliability of wireless communication, refer to a corresponding process description of any one of the methods for enhancing reliability of wireless communication in the foregoing method embodiments shown in FIG. 7 to FIG. 10. Details are not described herein again.

In conclusion, by means of the BS for enhancing reliability of wireless communication in this embodiment of the present application, transmission quality of a beam used for uplink transmission between a BS and a UE can be non-periodically measured based on event trigger, which improves real-time performance of detection and greatly enhances reliability of wireless communication.

Another embodiment of the present application further provides a schematic structural diagram of a system for enhancing reliability of wireless communication. The system may comprise a BS and any one of the UEs for enhancing reliability of wireless communication in the foregoing embodiments shown in FIG. 11 to FIG. 17.

Another embodiment of the present application further provides a schematic structural diagram of another system for enhancing reliability of wireless communication. The system may comprise a UE and any one of the BSs for enhancing reliability of wireless communication in the foregoing embodiments shown in FIG. 18 to FIG. 22.

A person of ordinary skill in the art may be aware that, in combination with the examples described in the embodiments disclosed in this specification, units and method steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present application.

When the functions are implemented in the form of a software functional unit and sold or used as an independent product, the functions may be stored in a computer-readable storage medium. Based on such an understanding, the technical solutions of the present application essentially, or the part contributing to the prior art, or a part of the technical solutions may be implemented in a form of a software product. The computer software product is stored in a storage medium, and comprises several instructions for instructing a computer device (which may be a personal computer, a controller, a network device, or the like) to perform all or a part of the steps of the methods described in the embodiments of the present application. The storage medium comprises any medium that can store program code, such as a USB flash drive, a removable hard disk, a read-only memory (ROM), a RAM, a magnetic disk, or an optical disc.

The foregoing implementing manners are merely intended to describe the present application rather than limit the present application. A person of ordinary skill in the art may make modifications and variations without departing from the spirit and scope of the present application. Therefore, all equivalent technical solutions shall also fall within the scope of the present application, and the patent protection scope of the present application shall be subject to the claims.

What is claimed is:

1. A method for enhancing reliability of wireless communication, comprising:

monitoring, by a user equipment (UE), quality of downlink transmission between the UE and a base station (BS); and measuring, by the UE in response to a trigger event, transmission quality of multiple beams used for the downlink transmission between the UE and the BS, wherein the trigger event is used to indicate that the quality of the downlink transmission between the UE and the BS does not meet a first preset condition, and if the UE determines, according to a measurement result, that transmission quality of a current active beam cannot meet a transmission requirement, selecting, by the UE, a beam as a new active beam for the downlink transmission, the trigger event comprises at least one of the following events:

transmission quality of an active beam used for the downlink transmission between the UE and the BS does not meet a second preset condition;

transmission quality of a standby beam used for the downlink transmission between the UE and the BS does not meet a third preset condition;

a time interval from a latest measurement of the transmission quality of the multiple beams used for the downlink transmission between the UE and the BS does not meet a fourth preset condition; and a latency change of a channel used for the downlink transmission between the UE and the BS does not meet a fifth preset condition, wherein the trigger event is comprised in reference signal (RS) configuration information.

2. The method of claim 1, wherein the measuring, by the UE, transmission quality of the multiple beams used for the downlink transmission between the UE and the BS comprises:

measuring, by the UE by using at least one RS, the transmission quality of the multiple beams used for the downlink transmission between the UE and the BS.

3. The method of claim 2, wherein the measuring, by the UE by using at least one RS, the transmission quality of the multiple beams used for the downlink transmission between the UE and the BS comprises:

sending, by the UE, an RS request to the BS;

determining, by the UE, a time/frequency resource of an RS according to an RS grant that is sent by the BS in response to the RS request;

receiving, by the UE on the time/frequency resource, at least one RS sent by the BS; and measuring, by the UE according to the at least one RS, the transmission quality of the multiple beams used for the downlink transmission between the UE and the BS.

4. The method of claim 3, wherein before the sending, by the UE, an RS request to the BS, the method further comprises:
receiving, by the UE, the RS configuration information sent by the BS.

5. The method of claim 4, wherein the RS configuration information comprises: a format of the RS request and/or the trigger event.

6. The method of claim 3, wherein the RS request carries information about the multiple beams used for the downlink transmission between the UE and the BS.

7. The method of claim 3, further comprising:
returning, by the UE, ACK signaling to the BS, wherein the ACK signaling is used to indicate that the UE has received the RS grant and/or the measurement has been completed.

8. The method of claim 1, further comprising:
adjusting a time threshold in response to a change of a movement speed of the UE.

9. The method of claim 8, wherein the movement speed of the UE comprises: an angular velocity of movement of the UE.

10. The method of claim 8, wherein the time threshold decreases as the movement speed of the UE increases.

11. The method of claim 1, wherein the downlink transmission between the UE and the BS comprises:
downlink data transmission between the UE and the BS; and/or
downlink control signaling transmission between the UE and the BS.

12. The method of claim 1, wherein the second preset condition indicates that a signal to noise ratio (SNR) of the active beam used for the downlink transmission between the UE and the BS is less than an SNR threshold.

13. The method of claim 1, wherein the fourth preset condition indicates that the time interval from the latest measurement of the transmission quality of the multiple beams used for the downlink transmission between the UE and the BS exceeds a time threshold.

14. The method of claim 1, wherein the fifth preset condition indicates that the latency change of the channel used for the downlink transmission between the UE and the BS exceeds a preset range.

15. User equipment (UE) for enhancing reliability of wireless communication, comprising a processor and a memory, wherein the memory have computer-executable instructions that, when executed, cause the processor to perform operations comprising:
monitoring quality of downlink transmission between the UE and a base station (BS); and
measuring, in response to a trigger event, transmission quality of multiple beams used for the downlink transmission between the UE and the BS, wherein the trigger event is used to indicate that the quality of the downlink transmission between the UE and the BS does not meet a first preset condition, and
if the UE determines, according to a measurement result, that transmission quality of a current active beam cannot meet a transmission requirement, selecting, by the UE, a beam as a new active beam for the downlink transmission,
the trigger event comprises at least one of the following events:
transmission quality of an active beam used for the downlink transmission between the UE and the BS does not meet a second preset condition;
transmission quality of a standby beam used for the downlink transmission between the UE and the BS does not meet a third preset condition;
a time interval from a latest measurement of the transmission quality of the multiple beams used for the downlink transmission between the UE and the BS does not meet a fourth preset condition; and
a latency change of a channel used for the downlink transmission between the UE and the BS does not meet a fifth preset condition,
wherein the trigger event is comprised in reference signal (RS) configuration information.

16. The UE of claim 15, wherein the measuring transmission quality of the multiple beams used for the downlink transmission between the UE and the BS comprises:
measuring, by using at least one RS, the transmission quality of the multiple beams used for the downlink transmission between the UE and the BS.

17. The UE of claim 16, wherein the measuring, by using at least one RS, the transmission quality of the multiple beams used for the downlink transmission between the UE and the BS comprises:
sending an RS request to the BS;
determining a time/frequency resource of an RS according to an RS grant that is sent by the BS in response to the RS request;
receiving, on the time/frequency resource, at least one RS sent by the BS; and
measuring, according to the at least one RS, the transmission quality of the multiple beams used for the downlink transmission between the UE and the BS.

18. The UE of claim 17, wherein the operations further comprise:
receiving the RS configuration information sent by the BS.

19. The UE of claim 18, wherein the RS configuration information comprises: a format of the RS request and/or the trigger event.

20. The UE of claim 17, wherein the RS request carries information about the multiple beams used for the downlink transmission between the UE and the BS.

21. The UE of claim 17, wherein the operations further comprise:
returning ACK signaling to the BS, wherein the ACK signaling is used to indicate that the UE has received the RS grant and/or the measurement has been completed.

22. The UE of claim 15, wherein the operations further comprise:
adjusting a time threshold in response to a change of a movement speed of the UE.

23. The UE of claim 22, wherein the movement speed of the UE comprises:
an angular velocity of movement of the UE.

24. The UE of claim 22, wherein the time threshold decreases as the movement speed of the UE increases.

25. The UE of claim 15, wherein the downlink transmission between the UE and the BS comprises:
downlink data transmission between the UE and the BS; and/or
downlink control signaling transmission between the UE and the BS.

26. The UE of claim 15, wherein the second preset condition indicates that a signal to noise ratio (SNR) of the active beam used for the downlink transmission between the UE and the BS is less than an SNR threshold.

27. The UE of claim 15, wherein the fourth preset condition indicates that the time interval from the latest measurement of the transmission quality of the multiple beams used for the downlink transmission between the UE and the BS exceeds a time threshold.

28. The UE of claim 15, wherein the fifth preset condition indicates that the latency change of the channel used for the downlink transmission between the UE and the BS exceeds a preset range.

\* \* \* \* \*